United States Patent
Rathnam et al.

(10) Patent No.: US 6,999,514 B2
(45) Date of Patent: Feb. 14, 2006

(54) MOTION COMPENSATION WITH SUBBLOCK SCANNING

(76) Inventors: Selliah Rathnam, 862 Sunny Brook Way, Pleasant, CA (US) 94566; Gwo Giun Lee, 5834 Newfields La., Dublin, CA (US) 94568; Shaori Guo, 1713 Noranda Dr., Apt. #2, Sunnyvale, CA (US) 94087; Chien-Hsin Lin, 718 Old San Francisco Rd. #262, Sunnyvale, CA (US) 94086

( * ) Notice: Subject to any disclaimer, the term of this patent is extended or adjusted under 35 U.S.C. 154(b) by 0 days.

(21) Appl. No.: 10/044,877

(22) Filed: Oct. 26, 2001

(65) Prior Publication Data

US 2003/0081680 A1 May 1, 2003

(51) Int. Cl.
*H04N 7/12* (2006.01)

(52) U.S. Cl. .............. 375/240.24; 375/240.12; 375/240.01

(58) Field of Classification Search .......... 375/240.24, 375/240.12, 240.01; 348/699, 700, 701, 414.1, 348/416.1, 417.1, 420.1, 422.1; 382/232; H04N 7/12, 5/14

See application file for complete search history.

(56) References Cited

U.S. PATENT DOCUMENTS

| | | | | | |
|---|---|---|---|---|---|
| 5,357,282 A | * | 10/1994 | Lee | ...... | 348/403.1 |
| 5,379,351 A | * | 1/1995 | Fandrianto et al. | ...... | 382/236 |
| 5,801,776 A | * | 9/1998 | Tamura et al. | ...... | 375/240.18 |
| 6,438,170 B1 | * | 8/2002 | Hackett et al. | ...... | 375/240.16 |
| 6,473,460 B1 | * | 10/2002 | Topper | ...... | 375/240.16 |
| 6,618,439 B1 | * | 9/2003 | Kuo et al. | ...... | 375/240.16 |
| 6,625,216 B1 | * | 9/2003 | Zhu | ...... | 375/240.16 |
| 6,680,975 B1 | * | 1/2004 | Jeong et al. | ...... | 375/240.23 |

FOREIGN PATENT DOCUMENTS

| WO | WO 98 08314 | | 2/1998 |
|---|---|---|---|
| WO | WO 00 70504 | | 11/2000 |
| WO | WO 03/036942 A1 | * | 5/2003 |

* cited by examiner

*Primary Examiner*—Nhon Diep

(57) ABSTRACT

According to an example embodiment, the present invention is directed to pixel-data processing that includes scanning a first 2×2 line in each of a series of immediately adjacent pixel blocks, prior to scanning a second 2×2 line in each of the series of pixel blocks. Each scanned line is then processed for motion compensation in a manner that addresses challenges, including those discussed above, related to buffer size requirements, power consumption requirements and latency.

13 Claims, 5 Drawing Sheets

MOTION COMPENSATION WITH SUBBLOCK SCANNING

FIELD OF THE INVENTION

The present invention is directed to video signal processing and, more particularly, to motion compensation in video signal processing.

BACKGROUND

Computer arrangements, including microprocessors and digital signal processors, have been designed for a wide range of applications and have been used in virtually every industry. For a variety of reasons, many of these applications have been directed to processing video data and have demanded minimal levels of power consumption and compactness. Some applications have further demanded a high-speed computing engine that can perform effectively on a real-time or near real-time basis. Many of these video-processing applications have required a data-signal processing circuit that is capable of performing multiple functions at ever-increasing speeds.

Increasing the power and versatility of such computing engines, however, can undermine other important goals. For example, faster computing engines consume more power and circuit real estate, whereas the ideal engine minimizes both power consumption and the amount of circuitry required to implement the computing engine.

Moreover, providing versatility and high power typically exacerbates the circuit real estate problem by requiring various types of processing circuitry, each specialized and selectively activated for different processing functions. This phenomena can be appreciated when comparing, for instance, relatively-slow general-purpose processing in video applications versus specialized video-signal filter processing used for compressing and decompressing video data in real time. Because the specialized processing circuitry is typically optimized to keep up with the real-time speeds of the video data, it is often difficult to provide a single video-data processing circuit that is adequately versatile without providing seemingly excess circuitry useful only for limited applications.

As a more particular example, many video-signal processing applications employ specialized video-signal filters for vertical signal processing which uses a specialized video-data filter known as a "polyphase" filter. In video-processing applications, a polyphase filter is used to resize pixels by manipulating data stored to represent the horizontal and vertical lines used to refresh the display. In such applications, expansion or up-sampling ("zoom-factor" greater than one) is achieved by increasing the ratio of the number of output pixels to the number of input pixels; whereas, compression or down-sampling ("zoom-factor" less than one) is achieved by decreasing the ratio of the number of output pixels to the number of input pixels.

Another particular type of video-signal processing application includes motion compensation and may employ devices such as multimedia coprocessors designed for motion compensated scan rate conversion. Motion compensation may be achieved by deinterlacing incoming fields followed by subsequent up conversion, both being based on motion information estimated and embedded in the form of motion vectors.

Conventional motion estimation includes scanning a row of 16 horizontally adjacent 8×8 pixel blocks by scanning all of the lines in an entire pixel block before moving on to scan adjacent pixel blocks. In order to accommodate a motion vector range, a horizontal width including additional pixels is needed. For example, to accommodate +/−60 pixels in the horizontal direction, a width of (16×8)+(2×60)=248 pixels is needed. In addition, 4 additional pixels are needed at each end for processing border blocks, resulting in 256 pixels in the horizontal direction. Similarly, in the vertical direction, 8+ (2×16)+8=48 lines are needed, along with 8 additional lines for updating data for the next 16 8×8 adjacent rows, resulting in 56 lines in the vertical direction.

This conventional motion estimation, relying upon scanning an entire pixel block before moving on to scan adjacent pixel blocks, and resulting in 56 lines scanned in the vertical direction in the specific example discussed above, presents many challenges. For example, buffers used in the motion correction must have sufficient lines to be able to accommodate the scanned lines. This results in a relatively large buffer, high power consumption and high latency for the scan.

The present invention is directed to goals including the above-mentioned and the minimization of line buffer usage, power consumption and latency in motion compensation and other types of pixel-data processing.

SUMMARY OF THE INVENTION

Various aspects of the present invention are directed to motion compensation where line buffers are used, and in a more specific application to motion compensation in which line buffers are used for processing scanned pixel data.

Consistent with one specific example embodiment, the present invention is directed to pixel-data processing that includes scanning a first 2×2 line in each of a series of immediately adjacent pixel blocks, prior to scanning a second 2×2 line in each of the series of pixel blocks. Each scanned line is then processed for motion compensation in a manner that addresses challenges, including those discussed above, related to buffer size requirements, power consumption requirements and latency.

In another particular example embodiment, the present invention is directed to motion compensation in a video signal processing circuit. Initially, a first 2×2 subblock line of a first 8×8 pixel block having at least two 2×2 subblock lines is scanned. After this scanning, a first 2×2 subblock line of a second immediately adjacent 8×8 pixel block is scanned, prior to scanning a second 2×2 subblock line of the first 8×8 pixel block, and then the scanned subblock lines are used for motion compensation in the video signal processing circuit.

Other example embodiments of the present invention are respectively directed to various other related aspects including method, circuit, and system-based implementations of such processing.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
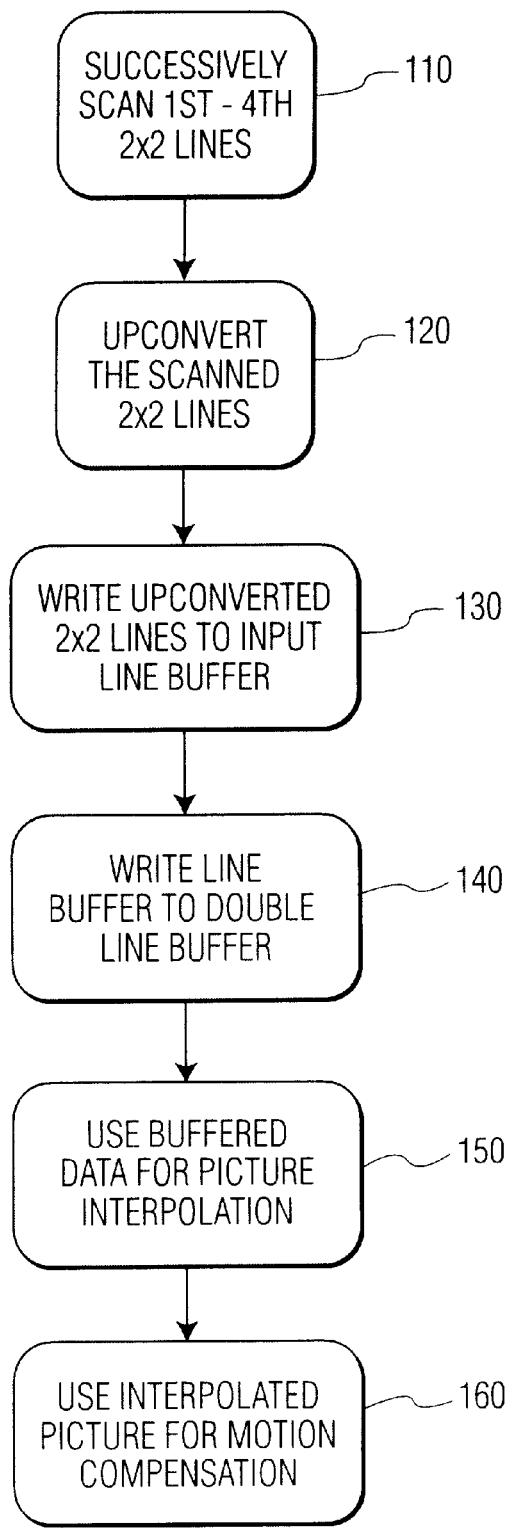
FIG. 1 is a flow diagram of a method for scanning pixel data for motion compensation, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS EXAMPLE EMBODIMENTS

The present invention is believed to be highly applicable to methods and arrangements for motion compensation in pixel processing where line buffers are used. The invention has been found to be particularly advantageous for pixel processing requiring or benefiting from use of input line buffers for picture interpolation used in motion compensation. While the present invention is not necessarily limited to such applications, an appreciation of various aspects of the invention is best gained through a discussion of examples in such an environment.

According to an example embodiment of the present invention, 8×8 pixel blocks are scanned, stored and used for motion compensation in a manner that exhibits desirable buffer size, power consumption and latency time. A first 2×2 subblock line of each of at least first and second immediately adjacent 8×8 pixel blocks are scanned, prior to scanning a second 2×2 subblock line of the first 8×8 pixel block. The scanned 2×2 subblock lines of the 8×8 pixel blocks are processed and used for motion compensation, such as for picture interpolation based upon the scanned pixel data. The picture interpolation can be based upon reading a single line of 2×2 subblocks across a plurality of 8×8 pixel blocks, prior to reading additional 2×2 subblock lines of each of the 8×8 pixel blocks. This is particularly useful in motion compensation applications where it is desirable to scan pixels extending beyond the 8×8 pixel block being scanned (e.g., scan additional pixels to the left and right, as well as the top and bottom, of an image field). By scanning an entire 2×2 subblock line of all 8×8 pixel blocks before moving to another 8×8 pixel block, many of the pixels extending beyond each pixel block have already been scanned, and the height of the scan includes only one line, rather than four lines. This results in a smaller amount of scanned data, which is useful, for example, for reducing the amount of buffer space required to store the data, thus reducing power requirements for storing the data. In addition, the smaller amount data can be scanned in a shorter amount of time, reducing the latency of the motion compensation process.

FIG. 1 is a flow diagram for motion compensation, according to a more particular example embodiment of the present invention. At block 110, pixel data in first through fourth 2×2 subblock lines of each of a plurality of immediately adjacent 8×8 pixel blocks are successively scanned. The scanned subblock lines are upconverted at block 120 and written into a first 2×128 line buffer at block 130. The scanned pixel data stored at the first 2×128 input line buffer is written into a second input line buffer at block 140 for double buffering. In one implementation, the second input line buffer is written simultaneously with the first input line buffer. The pixel data in the line buffers is then used to interpolate a picture at block 150, such as for estimating a picture at a time between a previous and current picture frame. The picture interpolation is used to produce a display that exhibits motion compensation at block 160.

The 2×2 subblock scanning and motion compensation are applicable to a variety of implementations. FIG. 1 shows a row 250 of 16 8×8 pixel blocks 200 through 216 being scanned, according to an example embodiment of the present invention. Each pixel block has four 2×2 lines of four pixels, wherein each of the four lines of the 8×8 pixel blocks make up lines 221, 222, 223 and 224 of the row 250 of pixel blocks. A total of 256 pixels are included in the row (pixels 0–255). Pixels 0–63 in the first line 221 are read successively, beginning with pixel block 200 and continuing through pixel block 215. After the first line 221 is scanned, pixels 64–127 are scanned from the second line 222, again beginning with pixel block 200 and continuing through pixel block 215. Pixel data in the third and fourth lines 223 and 224 are successively scanned in a similar manner to the scanning of data from the first and second lines 221 and 222. The scanned pixel data is then upconverted and stored in a first 2×128 input line buffer, and the data in the first input line buffer is copied to a second input line buffer used for double buffering. The pixel data in the line buffers is then processed for use in motion compensation.

Figure 2:
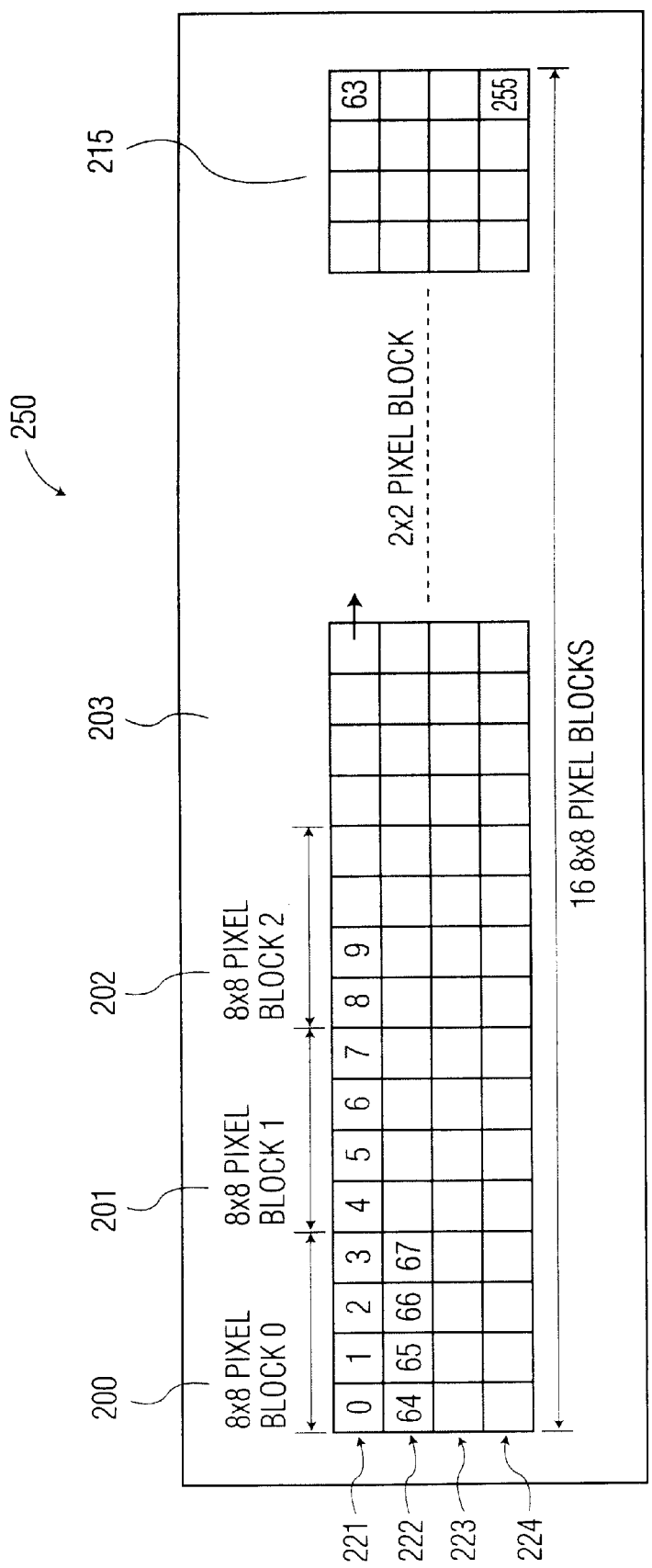
FIG. 2 is a pixel block arrangement being scanned for motion compensation, according to another example embodiment of the present invention.
Figure 3:
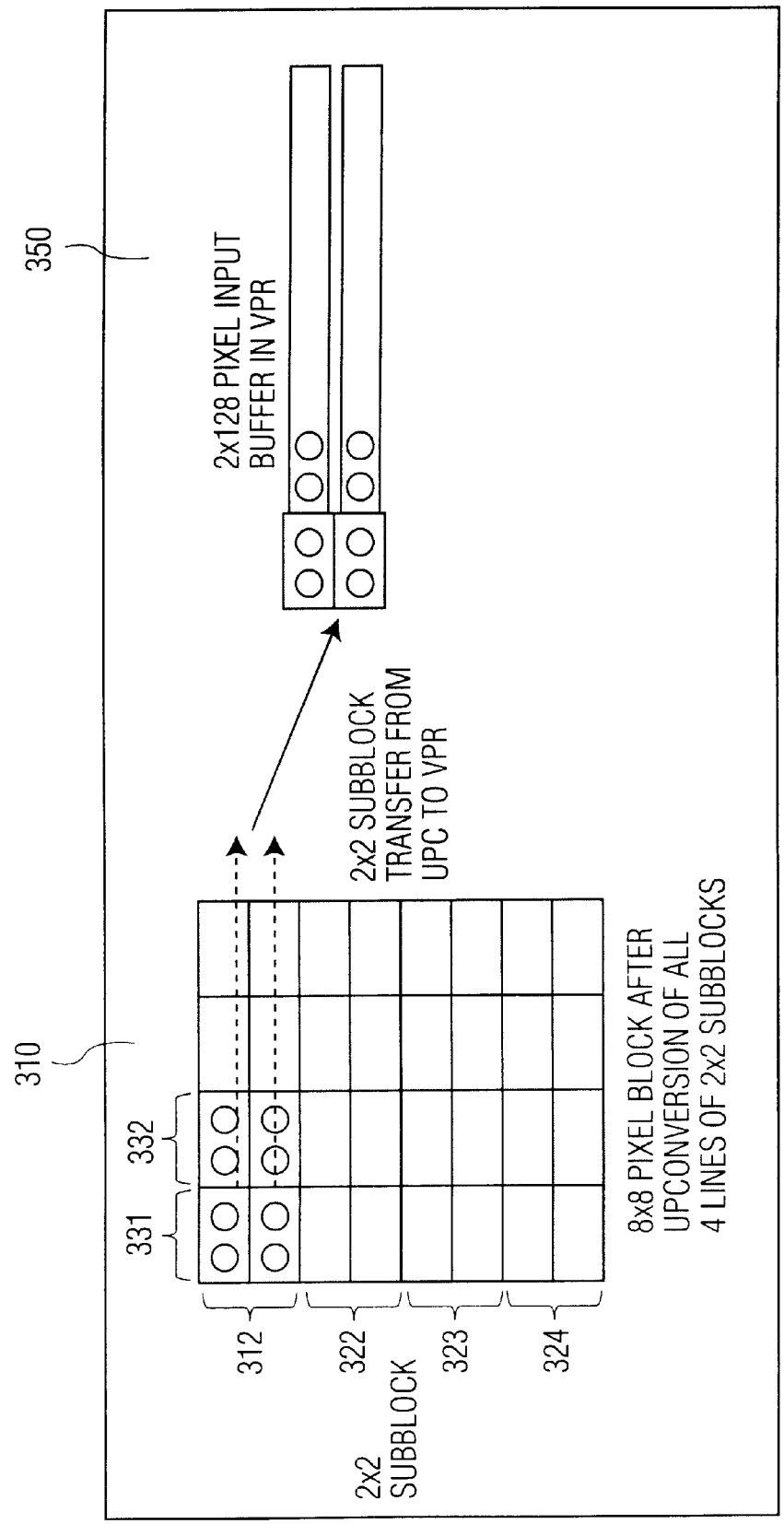
FIG. 3 is an up conversion of an 8×8 pixel block and transfer of a 2×2 subblock to a VPR input buffer for motion compensation, according to another example embodiment of the present invention.

The line buffers can be written to in a variety of manners and can be arranged in one or more of a variety of configurations. FIG. 3 is one such configuration, wherein the scanned 2×2 subblocks are upconverted as shown in table 310 and subsequently written to a FIFO 2×128 pixel input buffer 350, according to a more particular example embodiment of the present invention. The upconversion results in each line of 2×2 subblocks being arranged in 2×2 blocks including blocks 331 and 332 (e.g., which include the same number of pixels and respectively correspond to rows 221 and 222 of pixel block 0 of FIG. 2). The upconverted 2×2 subblocks are transferred to the input buffer 350 in succession, beginning with row 321, followed by rows 322, 323 and 324. When the FIFO input buffer is read, all of the 2×2 subblocks are read for each 8×8 pixel block before reading 2×2 subblocks for another 8×8 pixel block.

Figure 4:
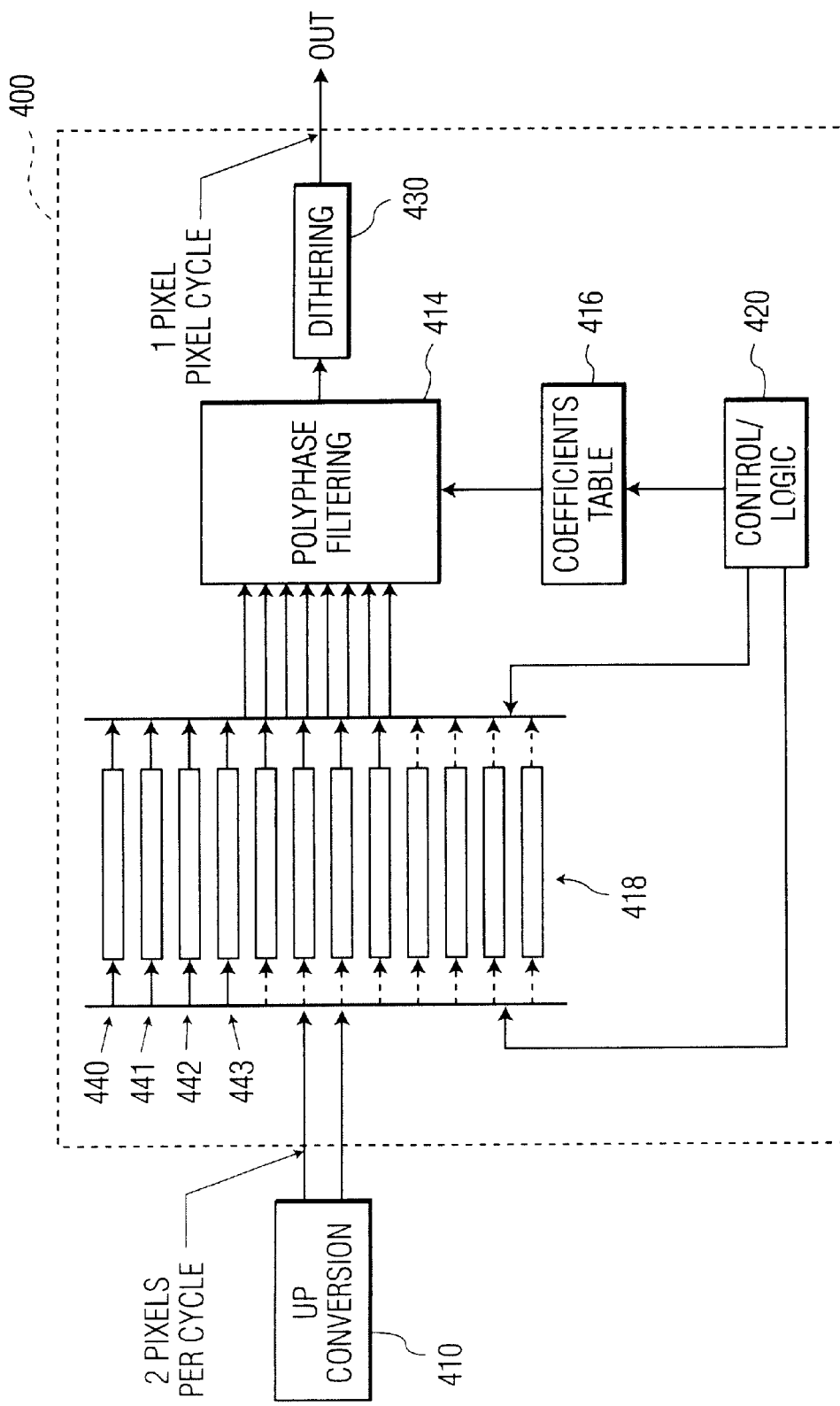
FIG. 4 is an input buffer being used in connection with another example embodiment of the present invention.

Consistent with the above-described method, FIG. 4 illustrates processing blocks arranged and configured to process pixel data in a vertical processing unit 400 having one of two modes of operation. The processing unit 400 may, for example, include the input line buffers discussed herein. For the throughput of the vertical processing unit 400, the input rate for vertical processing is two pixels per cycle and the output rate is one pixel per cycle due to an up conversion unit 410 always outputting two pixels in one cycle. The up conversion unit outputs two pixels in the vertical direction. In order to receive the pixels, there are two line buffers 440 and 441, and line buffers 442 and 443 are used as double buffers and store the same data stored in line buffers 440 and 441. Further, in this particular implementation, the length of each line buffer is adequate for storing the data corresponding to one-hundred-twenty-eight pixels.

In a more particular example embodiment, vertical processing is implemented to perform vertical linear or nonlinear sampling for a video signal input, and an 8-tap, 64-phase polyphase filter is used for expansion and compression operations. The line buffers in vertical processing are circulated depending on the scaling factor and geometrical position of output sampling pixels. In this regard, the polyphase filter can be adapted to filter the same pixels during the expansion operation. During the compression operation, some lines of pixels can be skipped. The line buffers are mainly used for de-coupling the input rate of incoming pixels for the scaling operation as well as the bypass mode of the vertical processing unit to the output pixels.

In FIG. 4, the vertical processing unit 400 produces processed pixel data at a rate of one pixel per cycle for storage in a memory (or storage unit) 412. The vertical processing unit 400 includes a polyphase filter having filtering stage 414 and coefficients table 416, a line-buffer circuit 418 including twelve line buffers and circuitry 420. The circuitry 420, which is implemented as logic or as a software routine for a programmable processor, is adapted to circulate data through the line-buffer circuit as is conventional when vertical scaling pixel data using a polyphase filter where the circulation of line buffers depends on the scaling factor. In this manner, the vertical processing circuit receives the pixel data at two pixels per cycle, resizes the data, and then outputs the resized pixel data for storage in the storage unit at a rate of one pixel per cycle.

The circuitry 420 also includes logic that is configured and arranged to cause the vertical processing circuit to switch between the first-mentioned resizing mode and a second mode in which the pixel data is not scaled. Via programming or another external prompt, the circuitry 420 disables the operation of the polyphase filter (414 and 416 of FIG. 4) and controls the line-buffer circuit 418 so that the received pixel data is double-buffered in the line-buffer circuit 418 using two of the line buffers. In this manner, the circulation of line buffers is for updating the new pixels every two consecutive line buffers, the polyphase filter is bypassed, and nonresized pixel data is output for storage in the storage unit at one pixel per cycle.

In a more particular implementation, an optional dithering circuit 430 is used to dither the data from nine bits to eight bits before the data is presented to the storage unit 412.

Figure 5:
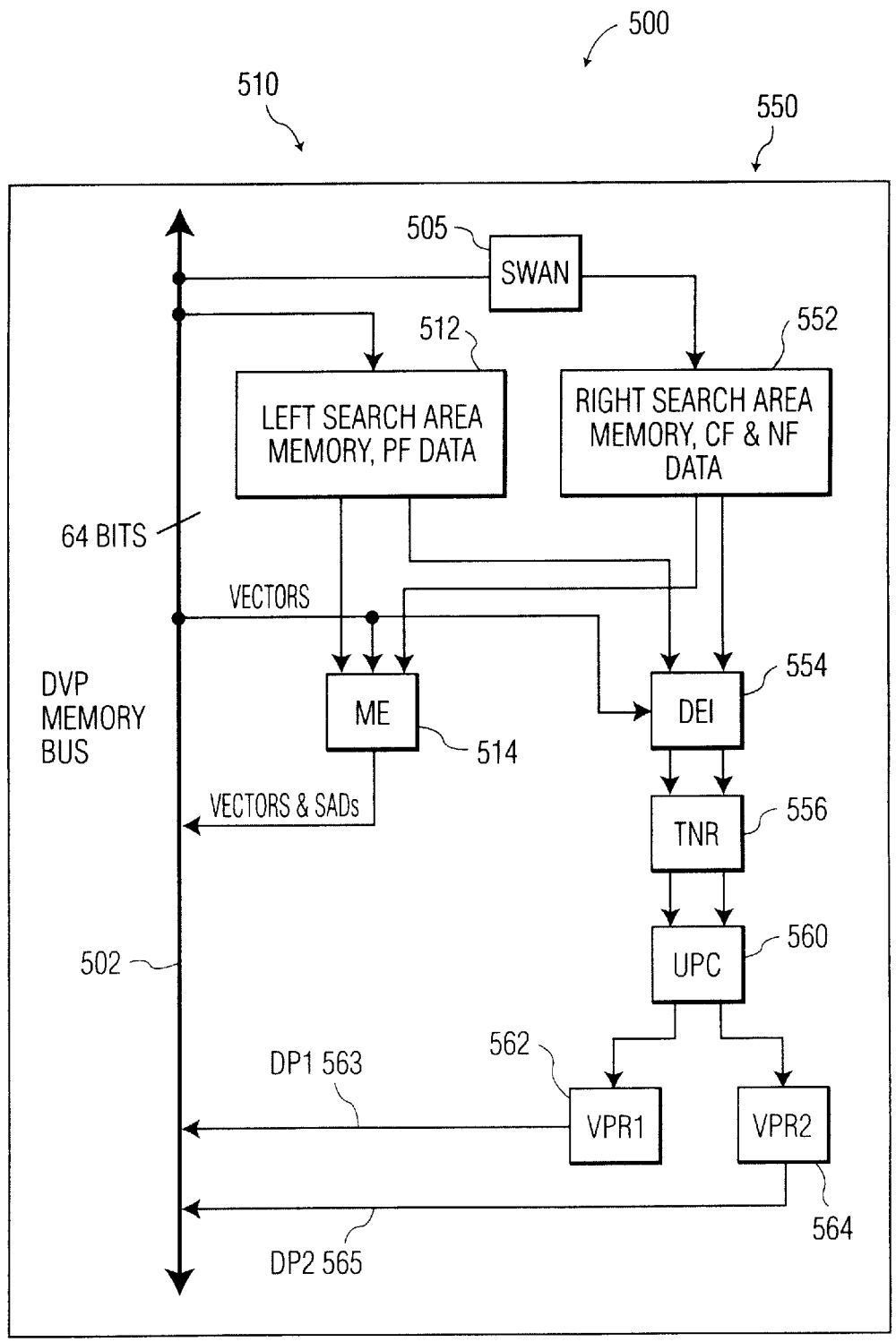
FIG. 5 shows architecture adaptable for use in connection with motion compensation, according to another example embodiment of the present invention.

FIG. 5 shows a multimedia coprocessor circuit 500 being used in connection with another example embodiment of the present invention, and may be used with one or more of the example implementations described above. The circuit 500 includes a motion estimation pipeline portion 510 and a motion compensation pipeline portion 550. The motion estimation pipeline consists mainly of a motion estimation (ME) unit 514 that is responsible for 3D estimation of motion vectors (MV) for every 8×8 pixel block using either 2, 3, or 4 input fields. These field data are saved in the left side memory 512 and right side memory 552 with two fields of a previous video frame (PF) being stored in the left side memory and a current video field (CF) and next video field (NF) being stored in the right side memory. A SWAN unit 505 is responsible for Gaussian noise reduction when the circuit 500 receives the CF and NF data from a 64 bit DVP highway 502 and before loading the pixel data into the right search area memory.

The right side of FIG. 5 illustrates the motion compensation pipe 550 that shares the same left and right area memories 512 and 552 with the motion estimation pipe 510 at two different passes. Based on the motion information estimated in the MV's for every 8×8 pixel in the motion estimation pipe, the motion compensation pipe first performs block erosion to each of the 8×8 pixel blocks resulting in sixteen eroded MV's, one for each 2×2 pixel block read into the pipe. A de-interlacer (DEI) 554 then interpolates the missing line of the incoming CF data to a progressive frame. The data is then passed to the Temporal Noise Reduction (TNR) unit 556 for 3D noise reduction using the now current frame and the previous frame. The up conversion unit (UPC) 560 then interpolates a new picture or frame at time instances between the previous and current frame that are divided into n, or thirty-two, time instances. The motion compensation pipe supports the interpolation of two pictures that are called display output 1 and 2 (DP1 563 and DP2 565) respectively. In addition, depending on the requirements of the display output to be either interlaced or progressive, Vertical Processing Units (VPR) 562 and 564 can either be used to vertically scale the display output (DP) to a field or be bypassed so that the outputs are progressive frames. Motion compensation has two identical instantiations of the VPR unit, VPR1 562 and VPR2 564 used for DP1 and DP2, respectively. The interpolation of the two display output pictures (DP1 and DP2) are produced via the time multiplexing of the single DEI, TNR, and UPC units.

The multimedia coprocessor circuit 500 is adapted to scan a first 2×2 line of a plurality of pixel blocks, prior to scanning a second 2×2 line within a single pixel block, such as described in FIG. 1. In the specific implementation where a video field column width of 128 pixels is used, the circuit 500 is programmed to scan a 2×2 subblock in a manner such that four rows of 64 2×2 subblocks are scanned in succession for a total of 256 pixels. For scan rate conversion, the UPC 560 is adapted to interpolate at most two new image frames for output display, and the data is passed to the two VPR's 562 and 564. Since VPR1 562 processes data from DP1 and VPR2 564 from DP2, the following description uses only one VPR and DP with the operation being identical for both. The architecture of each VPR is designed to contain 12 line buffers, each capable of containing 128 pixels, and eight line buffers are used for the vertical filtering. The UPC 560 passes interpolated DP data to the VPR on a 2×2 subblock basis (e.g., as shown in FIG. 3). Thus, two line buffers are used as an input FIFO of the motion compensation pipe 550 at the VPR stage. An additional two line buffers of 128 pixels are also used for double buffering the input data from UPC 560.

In a more particular implementation, when applying the present invention of 2×2 subblock scanning, the circuit 500 exhibits a pipeline latency of 2×128=256 cycles latency in processing every row of 16 8×8 pixel blocks. In the example of an image that is 720 pixels wide and 576 lines high, one needs to process a total of (576/8)*(720/(8*16)), which is approximately equal to 72*6=432 rows of 8×8 blocks. With each block having a latency of 256 cycles and 50 input interlaced fields per second, we will only expect to have a latency of 432*256*50=552960 cycles per second. This is particularly advantageous over conventional applications, where the motion compensation pipe scans through 8×8 pixel blocks and every row of 16 8×8 pixel blocks will require 8×126=1024 cycles. The motion compensation pipe latency in such a conventional application is 432*1024*50= 22.12 Mcycles per second. Thus, using the 2×2 subblock scanning with shorter pipeline latency will alleviate frequency constraints on designs based on present CMOS technology.

Accordingly, various embodiments have been described as example implementations of the present invention for saving hardware and offsetting complexity in pixel-data processing applications. In various implementations of the present invention, the number of line buffers required is reduced significantly, there is no extra cost in terms of hardware or design complexity, and throughput is not adversely affected by the bypass operation.

The present invention should not be considered limited to the particular examples described above. Various modifications, equivalent processes, as well as numerous structures to which the present invention may be applicable fall within the scope of the present invention, as fairly set forth in the appended claims.

What is claimed is:

1. A method for motion compensation in a video signal processing circuit, the method comprising:

scanning a first 2×2 subblock line of a first 8×8 pixel block having at least two 2×2 subblock lines;

after scanning the first 2×2 subblock line of the first 8×8 pixel block, scanning a first 2×2 subblock line of a second immediately adjacent 8×8 pixel block, prior to scanning a second 2×2 subblock line of the first 8×8 pixel block; and using the scanned subblock lines for motion compensation in a video signal processing circuit.

2. The method of claim 1, further comprising scanning a first 2×2 subblock line of a plurality of 8×8 pixel blocks, prior to scanning the second 2×2 subblock line of the first 8×8 pixel block.

3. The method of claim 2, further comprising storing the scanned first 2×2 subblock lines of all of the 8×8 pixel blocks into an input line buffer, wherein using the scanned subblock lines for motion compensation in a video signal processing circuit includes using the scanned lines stored in the line buffer.

4. The method of claim 3, wherein the 8×8 pixel blocks each include four 2×2 subblock lines, further comprising:

scanning a second 2×2 subblock line of all of the 8×8 pixel blocks, after scanning the first 2×2 subblock line;

successively scanning third and fourth 2×2 subblock lines of all of the 8×8 pixel blocks;

upconverting the scanned 2×2 subblock lines and storing the upconverted lines in first and second line buffers in an order beginning with 2×2 subblocks from the first one of the 8×8 pixel blocks; and wherein using the scanned subblock lines for motion compensation includes using the scanned subblock lines stored in the input line buffers.

5. The method of claim 4, further comprising copying the stored 2×2 subblocks from the first and second input line buffers into third and fourth input line buffers used for double buffering, respectively, wherein using the scanned subblock lines for motion compensation includes using the scanned subblock lines stored for double buffering.

6. The method of claim 4, wherein storing the 2×2 subblock lines in the first and second input line buffers includes storing the 2×2 subblock lines in first and second input line buffers that are about 75% smaller than input line buffers that would be required to store the lines in the 8×8 pixel blocks, were all of the 2×2 subblock lines of each 8×8 pixel block scanned, prior to scanning another 8×8 pixel block.

7. The method of claim 4, wherein scanning the 2×2 subblock lines includes scanning a single pixel during a clock cycle, wherein the scanning of all of the 2×2 subblock lines is effected about 40 times faster than scanning all of the 2×2 subblock lines would be effected, were all of the 2×2 subblock lines of each 8×8 pixel block scanned, prior to scanning 2×2 subblock lines of another 8×8 pixel block.

8. The method of claim 4, wherein scanning and storing the 2×2 subblock lines includes using less power than would be required, were all of the 2×2 subblock lines of each 8×8 pixel block scanned, prior to scanning another 8×8 pixel block.

9. The method of claim 4, wherein upconverting the scanned 2×2 subblock lines and storing the upconverted lines in first and second line buffers includes upconverting and storing the upconverted 2×2 subblock lines in first and second line buffers as they are scanned.

10. A method for motion compensation in a video signal processing circuit having sixteen immediately adjacent 8×8 pixel blocks, each 8×8 pixel block having four 2×2 subblock lines of four pixels, the method comprising:

scanning 64 pixels of a first 2×2 subblock line of each of the sixteen immediately adjacent 8×8 pixel blocks, upconverting the scanned pixels and storing the upconverted pixels of the first scanned subblock line in a first FIFO input line buffer of a vertical processing unit (VPR), the input line buffer having two lines, each line being 128 pixels wide;

after scanning the first 2×2 subblock line, successively scanning and storing the 64 pixels in each of the remaining ones of the four subblock lines of each of the 8×8 pixel blocks in the first FIFO input line buffer;

using the buffered data to interpolate a picture; and using the interpolated picture for motion compensation.

11. The method of claim 10, wherein using the buffered data to interpolate a picture includes vertically scaling a display output of the scanned pixel data to a field.

12. The method of claim 10, wherein using the buffered data to interpolate a picture includes bypassing the VPR and outputting progressive frames.

13. A video signal processing circuit including motion compensation, the circuit comprising:

means for scanning a first 2×2 subblock line of a first 8×8 pixel block having at least two 2×2 subblock lines;

means, responsive to scanning the first 2×2 subblock line of the first 8×8 pixel block, for scanning a first 2×2 subblock line of a second immediately adjacent 8×8 pixel block, prior to scanning a second 2×2 subblock line of the first 8×8 pixel block; and means for using the scanned subblock lines for motion compensation in a video signal processing circuit.

* * * * *